(12) United States Patent  
Budmiger

(10) Patent No.: US 8,220,342 B2  
(45) Date of Patent: *Jul. 17, 2012

(54) MAGNETO INDUCTIVE FLOW MEASURING DEVICE

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 453 days.

This patent is subject to a terminal disclaimer.

(21) Appl. No.: 12/083,693

(22) PCT Filed: Sep. 22, 2006

(86) PCT No.: PCT/EP2006/066638  
§ 371 (c)(1), (2), (4) Date: Jul. 13, 2010

(87) PCT Pub. No.: WO2007/045540  
PCT Pub. Date: Apr. 26, 2007

(65) Prior Publication Data  
US 2010/0281996 A1    Nov. 11, 2010

(30) Foreign Application Priority Data

Oct. 20, 2005    (DE) .......................... 10 2005 050 655

(51) Int. Cl.  
*G01F 1/58* (2006.01)
(52) U.S. Cl. ..................................................... 73/861.11
(58) Field of Classification Search ............... 73/861.12, 73/861.13, 861.11  
See application file for complete search history.

(56) References Cited

U.S. PATENT DOCUMENTS 7,921,736 B2 *  4/2011  Budmiger .................. 73/861.13  
8,051,722 B2 * 11/2011  Voigt et al. ................. 73/861.12

FOREIGN PATENT DOCUMENTS

| DE | 199 17 268 A1 | 11/2000 |
| EP | 0 969 268 A1 | 1/2000 |
| EP | 1 460 394 A2 | 9/2004 |
| GB | 2 348 964 A | 10/2000 |
| RU | 2030713 C1 | 3/1995 |

* cited by examiner

*Primary Examiner* — Jewel V Thompson  
(74) *Attorney, Agent, or Firm* — Bacon & Thomas, PLLC

(57) ABSTRACT

A magneto-inductive flow measuring device, including: A measuring tube, through which a medium flows essentially directed along a measuring tube axis; a magnet arrangement, which produces an alternating magnetic field passing through the measuring tube essentially perpendicularly to the measuring tube axis; two measuring electrodes arranged essentially on a line directed essentially perpendicularly to the measuring tube axis and to the magnetic field; and a control/evaluation unit, which determines volume, or mass, flow of the medium through the measuring tube on the basis of a measurement voltage tapped on the measuring electrodes. In order to detect an error state at the flow measuring device early, the control/evaluation unit determines current, actual, settling time to reach a stable measurement state of the measuring device. The control/evaluation unit then compares the actual settling time with a desired settling time predetermined for the measuring device for reaching the stable measurement state and generates an error report, when the actual settling time is greater than the predetermined, desired, settling time.

11 Claims, 2 Drawing Sheets

MAGNETO INDUCTIVE FLOW MEASURING DEVICE

TECHNICAL FIELD

Figure 1:
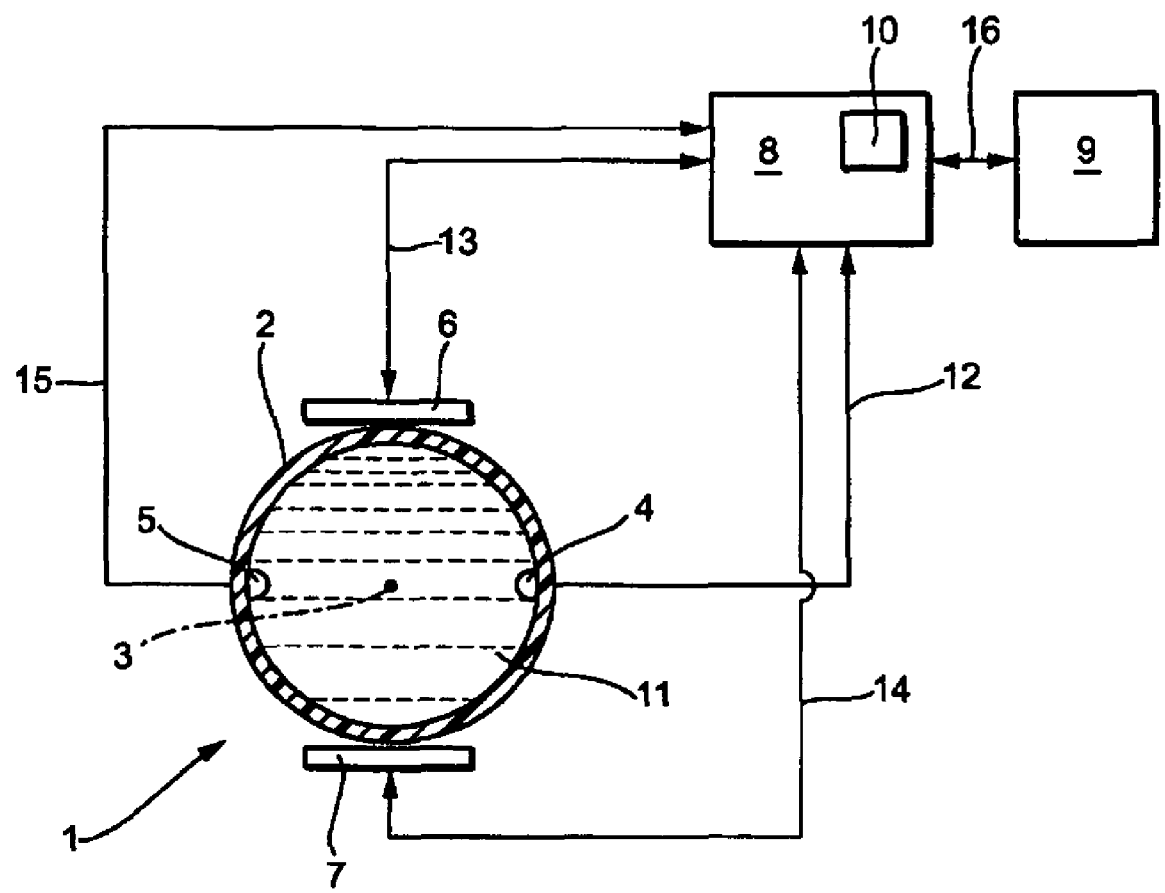

The invention relates to a magneto-inductive flow measuring device, including: a measuring tube, through which a medium flows essentially in the direction of the measuring tube axis; a magnet arrangement producing an alternating magnetic field passing through the measuring tube essentially perpendicularly to the measuring tube axis; two measuring electrodes arranged essentially on a line, with the line being directed essentially perpendicularly to the measuring tube axis and to the magnetic field; and a control/evaluation unit, which determines volume, or mass, flow, e.g. flow rate, of the medium through the measuring tube on the basis of a measurement voltage tapped on the measuring electrodes.

BACKGROUND DISCUSSION

Magneto-inductive flow measuring devices use for volumetric flow measurement the principle of electrodynamic induction: Charge carriers of the medium moved perpendicularly to a magnetic field induce a voltage in the measuring electrodes likewise arranged essentially perpendicularly to the flow direction of the medium. This measurement voltage induced in the measuring electrodes is proportional to the flow velocity of the medium averaged over the cross section of the measuring tube; such voltage is, thus, proportional to volume flow. In the case of known density of the medium, it is, moreover, possible to give the mass flow of the medium flowing through the measuring tube. The measuring electrodes are usually coupled with the medium galvanically or capacitively.

In connection with determining and/or monitoring volume flow by means of a magneto-inductive measuring device, the trend is increasingly in the direction of making available to the user, besides the volume flow, also information concerning the functional ability of the measuring device. The current catchword in this connection is 'Predictive Maintenance'. The goal of these efforts is, in the end, to prevent, or reduce to a minimum, measuring device downtime.

SUMMARY OF THE INVENTION

An object of the invention is to improve a magneto-inductive flow measuring device as concerns its ability to provide information regarding a measuring device defect, or defects in individual components of the measuring device.

The object is achieved by the following features: The control/evaluation unit determines the current settling time needed to reach a stable measurement state of the measuring device; the control/evaluation unit compares the actual settling time with a desired settling time predetermined for the measuring device to reach the stable measurement state; and the control/evaluation unit generates an error report, when the actual settling time is greater than the predetermined, desired settling time. The term 'settling time' refers herein to mean the time needed by the magneto-inductive flow measuring device to reach a stable operating state following a startup. This stable operating state is reached by the measuring device via an iterative approximation process, during which the control variable, or variables, is/are ascertained for e.g. the optimum, sensor-specific reversing of the magnetic field. Appropriate approximation processes are already known in the state of the art and are set forth in detail below. If the usual, predetermined settling time of the flow measuring device is exceeded at a later point in time, then this is an indication that a defect is present in the flow measuring device.

Especially, it is provided that the control/evaluation unit generates the error report, when the deviation between the current, actual settling time and the desired settling time for reaching a stable measuring state of the measuring device lies outside a predetermined tolerance value.

In an advantageous further development of the device of the invention, it is provided that the control/evaluation unit, in the presence of an actual settling time exceeding the predetermined, desired settling time for reaching a stable measurement state of the measuring device, generates the error report that the mechanical stability of the magnet arrangement is disturbed. Thus, a lengthened settling time is an indication that e.g. the securement of the pole shoes of the magnet arrangement is no longer effective. The vibrations brought about by the mechanical instability during switching for reversal of the magnetic field lengthen the settling time of the coil current quite significantly.

According to the invention, as a result, by the monitoring of the settling time, a mechanically instable magnet system is reliably detected.

As already indicated, the desired settling time is the time required until the measuring device has ascertained an optimum value for at least one control variable. The control variable is a sensor-specific variable, especially the magnetic field strength, or the coil current flowing through a coil arrangement of the magnet arrangement following switching of the magnetic field.

As already mentioned above, the control/evaluation unit determines the sensor-specific variable, or the control variable, preferably via an iterative approximation process, wherein the approximation process starts with a predetermined start value of the sensor-specific variable, or control variable. In an advantageous embodiment of the flow measuring device of the invention, it is provided that the sensor-specific variable, or control variable, which the control/evaluation unit ascertains iteratively, involves the minimum time required until the current flowing through the coil arrangement reaches an essentially constant end value $I_{const}$.

In the case of a magneto-inductive flow measuring device, reversal of the magnetic field is controlled via the coil current flowing through the coils of the magnet arrangement. In the ideal case, the curve for current in the coil arrangement corresponds to the curve for the magnetic field. Due to eddy currents which arise in the pole shoes and cores of the coil arrangement during switching of the magnetic field, deviations from the ideal case arise in the real case. The coil current measured externally of the coil arrangement corresponds, thus, to the sum of the current flowing in the coil and the current produced by the eddy currents. If the current measured externally of the coil arrangement is applied as control variable, it results, it is true, that the current is constant, but not the magnetic field. This remains true until the eddy currents die out.

For avoiding this problem, it is proposed in EP 0 969 268 A1 that the current not be used directly for regulating the voltage across the coil arrangement. For rapid reversal of the direction of the magnetic field, an overvoltage is applied to the coil arrangement for a rise time during the switching of the magnetic field. The duration of the overvoltage is successively so adjusted that, over the course of the rise time, the electrical current maximum is achieved, so that no further increase of the coil current occurs. Following reaching of the maximum, the coil current asymptotically approaches its end value. According to the solution known from the state of the art, the magnetic field has, with the reaching of the electrical current maximum, a constant magnetic field end value corresponding to the constant end value of the current. The duration of the switching phase is given by the characteristic of the coil current. Since the stability of the measurement signal is degraded, among other things, also by inductive in-coupling from the coil arrangement to the measuring electrodes, both the voltage across the coil arrangement as well as also the current through the coils must be constant during measurement of the voltage difference between the measuring electrodes. In the case of the solution known from the state of the art, this is, due to the asymptotic approach to the end value, first the case after the eddy currents have completely decayed.

An alternative embodiment of the flow measuring device of the invention provides on the basis of EP 1 460 394 A2 that the sensor-specific variable, or control variable, which the control/evaluation unit iteratively ascertains, is the reference time period $t_{ref}$, during which the control/evaluation unit applies to the coil arrangement during switching of the magnetic field a driving, overvoltage $U_{drv}$, with the overvoltage $U_{drv}$ being so dimensioned at the reaching of the stable measurement state that the current flowing through the coil arrangement falls, after passage of the reference time period, steadily toward an essentially constant end value $I_{const}$.

The ascertaining of the optimum time period $t_{short}$ occurs preferably by means of a trial-and-error procedure. The measured values ascertained during one switching phase are used for optimizing the time period $t_{short}$ for the following switching phase.

Preferably, the procedure is as follows: The control/evaluation unit applies a countervoltage to the coil arrangement during a first switching step for a predetermined time period $t_{short}$; then, the control/evaluation unit registers a plurality of measured values of electrical current during the predetermined time period $t_{cont}$; for the case that with the expiration of the time period $t_{short}$ the end value of the electrical current has not been reached, the time period $t_{short}$ is increased; for the case that with the expiration of the time period $t_{short}$ the end value of the electrical current has been reached early, the time period $t_{short}$ is decreased.

In an advantageous further development of the device of the invention, it is provided that the control/evaluation unit checks the actual settling time in predetermined, periodic or aperiodic intervals. Alternatively, it is provided that the control/evaluation unit triggers the determining, or checking, of the actual settling time by a command.

BRIEF DESCRIPTION OF THE DRAWING FIGURES

Figure 2:
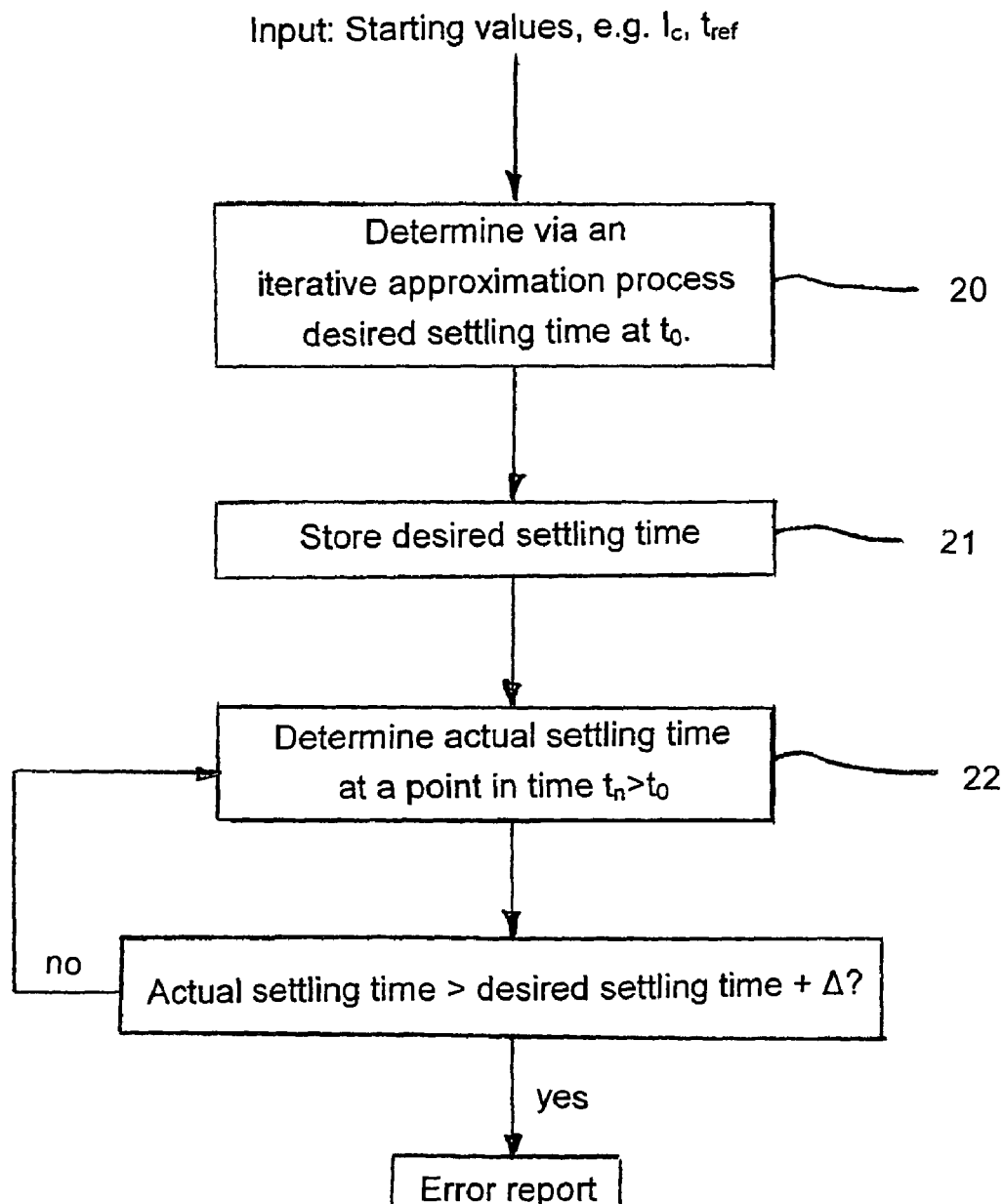

The invention will now be explained in greater detail on the basis of the appended drawing, the figures of which show as follows:

FIG. 1 is a schematic presentation of the flow measuring device of the invention; and FIG. 2 is a flow diagram for operation of the control/evaluation unit.

DETAILED DISCUSSION

FIG. 1 is a schematic presentation of an embodiment of the flow measuring device 1 of the invention. The medium 11 flows through the measuring tube 2 in the direction of the measuring tube axis 3. Medium 11 is electrically conductive, at least slightly. Measuring tube 2 is itself made of a non-conductive material or is, at least, lined on its inner surface with a non-conductive material.

The magnetic field B directed essentially perpendicularly to the flow direction of the medium 11 is produced via the diametrally arranged, coil arrangement 6, 7, i.e. two electromagnets. Under influence of the magnetic field B, charge carriers located in the medium 11 migrate, depending on polarity, to one of the two oppositely poled, measuring electrodes 4, 5. The voltage rising on the measuring electrodes 4, 5 is proportional to the flow velocity of the medium 11 averaged over the cross section of the measuring tube 2, i.e. it is a measure for the volume flow of the medium 11 in the measuring tube 2. Measuring tube 2 is, moreover, connected via connecting elements, e.g. flanges, which are not specially shown in the drawing, with a pipe system (not shown), through which the measured medium 11 flows.

In the two shown cases, the measuring electrodes 4, 5 are in direct galvanic contact with the measured medium; the coupling can, however, as already mentioned above, be capacitive in nature.

Via connecting lines 12, 13, the measuring electrodes 4, 5 are connected with the control/evaluation unit 8. Connection between the coil arrangement 6, 7 and the control/evaluation unit 8 is accomplished via the connecting lines 14, 15. Control/evaluation unit 8 is connected with an input/output unit 9 via the connecting line 16. Associated with the evaluation/control unit is a memory unit 10.

FIG. 2 shows a flow diagram for operation of the control/evaluation unit 8. Starting values for the separate control variables are, in each case, provided as a function of the applied iterative approximation process. For instance, if the iterative approximation process proposed in EP 0 969 268 A1 is applied, then starting values for the rise time, during which an overvoltage is applied to the coil arrangement, and for the overvoltage itself must be input.

If the solution disclosed in EP 1 460 394 A2 is applied, then a start value for the reference time period $t_{ref}$ is needed, during which the control/evaluation unit applies an overvoltage $U_{drv}$ to the coil arrangement, with the overvoltage $U_{drv}$ being so dimensioned at the reaching of the stable measurement state that the electrical current flowing through the coil arrangement after expiration of the reference time falls steadily to an essentially constant end value $I_{const}$. Additionally, it is necessary in this case to give a starting value for the overvoltage $U_{drv}$.

At program point 20, the selected iterative approximation process is applied to determine the desired settling time; at program point 21, the ascertained, desired, settling time is stored.

At point 22, at a later point in time (for example, after a renewed startup of the flow measuring device 1), the actual settling time up to the reaching of a stable operating state of the measuring device 1 is ascertained and compared with the stored, desired settling time. In case the actual settling time exceeds the predetermined, desired settling time by a time period Δ, this check being done at the program point 23, such is an indication of a mechanical defect involving the measuring device and affecting the correct switching of the magnetic field. In this case, at program point 24, an error report is issued. The defect can be, for example, a loosening of the magnet arrangement due to a loosened securement. Due to the mechanical instability of the magnet arrangement and the vibrations excited subsequently upon the switching of the magnetic field, the settling of the coil current is lengthened and, as a result, so is the desired settling time.

If, on the other hand, at program point 22, the actual settling time lies within a predetermined tolerance A around the desired settling time, then, at a suitable later point in time, the actual settling time is determined again and compared with the predetermined desired settling time.

The invention claimed is:

1. A magneto-inductive flow measuring device, comprising:
   a measuring tube, through which a medium flows essentially directed along a measuring tube axis;
   a magnet arrangement, which produces an alternating magnetic field passing through said measuring tube essentially perpendicularly to said measuring tube axis;
   two measuring electrodes arranged essentially on a line directed essentially perpendicularly to said measuring tube axis and to the magnetic field; and
   a control/evaluation unit, which determines volume, or mass, flow of the medium flowing through said measuring tube on the basis of a measurement voltage tapped on said measuring electrodes, wherein:
   said control/evaluation unit determines a current, actual, settling time to reach a stable measurement state of the measuring device,
   compares the actual settling time with a desired settling time predetermined for the measuring device for reaching the stable measurement state, and
   generates an error report, when the actual settling time is greater than the predetermined, desired, settling time.

2. The device as claimed in claim 1, wherein:
   said control/evaluation unit generates the error report, when a deviation between the current, actual setting time and the desired settling time up to reaching of a stable measurement state of the measuring device lies outside of a predetermined tolerance value.

3. The device as claimed in claim 1, wherein:
   said control/evaluation unit generates the error report due to an actual settling time exceeding the predetermined, desired, settling time for reaching a stable measurement state of the measuring device, on the basis that mechanical stability of said magnet arrangement is disturbed.

4. The device as claimed in claim 1, wherein:
   the desired setting time is a time required until the measuring device has ascertained an optimum value for at least one control variable.

5. The device as claimed in claim 4, wherein:
   said control variable is a sensor-specific variable.

6. The device as claimed in claim 5, wherein:
   said control variable is magnetic field strength, or coil current flowing through said magnetic arrangement following switching of the magnetic field.

7. The device as claimed in claim 5, wherein:
   said control/evaluation unit determines the sensor-specific variable, or the control variable, via an iterative approximation process; and
   said approximation process starts with a predetermined starting value of said sensor-specific variable, or said control variable.

8. The device as claimed in claim 7, wherein:
   said sensor-specific variable, or said control variable, which said control/evaluation unit iteratively ascertains, is a minimum time period until current flowing through said magnetic arrangement has reached an essentially constant end value.

9. The device as claimed in claim 7, wherein:
   said sensor-specific variable, or said control variable, which said control/evaluation unit iteratively ascertains, is a reference time period, during which said control/evaluation unit applies an overvoltage to said magnetic arrangement during switching of the magnetic field; and
   the overvoltage at reaching the stable measurement state is so dimensioned, that the current flowing through said magnetic arrangement following expiration of the reference time period steadily falls to an essentially constant end value.

10. The device as claimed in claim 1, wherein:
    said control/evaluation unit checks the actual settling time in predetermined, periodic or aperiodic intervals.

11. The device as claimed in claim 1, wherein:
    said control/evaluation unit triggers checking of actual settling time by a command.

* * * * *